United States Patent [19]

Sakazume

[11] 4,198,825
[45] Apr. 22, 1980

[54] MASTER CYLINDER

[75] Inventor: Takeshi Sakazume, Yokohama, Japan

[73] Assignee: Tokico Ltd., Kanagawa, Japan

[21] Appl. No.: 904,918

[22] Filed: May 3, 1978

Related U.S. Application Data

[63] Continuation of Ser. No. 743,215, Nov. 18, 1976, abandoned.

[51] Int. Cl.² ............................................. B60T 7/02
[52] U.S. Cl. ...................................... 60/594; 92/171; 74/18.2
[58] Field of Search ................ 92/170, 171, 13.6, 169, 92/128, 165 PR, 168; 60/533, 585, 592, 594; 74/18.2, 110, 503; 403/13, 14, 61, 80; 29/156.4 WL, 453

[56] References Cited

U.S. PATENT DOCUMENTS

| 926,966 | 7/1909 | Shirley | 29/156.4 WL |
|---|---|---|---|
| 2,188,355 | 1/1940 | Hunt | 60/592 |
| 2,202,351 | 5/1940 | Loweke | 74/18.2 |
| 2,759,329 | 8/1956 | Ponti | 92/171 |
| 2,954,675 | 10/1960 | Reynolds | 92/171 |
| 3,013,393 | 12/1961 | Erickson | 60/592 |

FOREIGN PATENT DOCUMENTS 521441  5/1940  United Kingdom ..................... 60/585

*Primary Examiner*—Abraham Hershkovitz
*Attorney, Agent, or Firm*—Wenderoth, Lind & Ponack

[57] ABSTRACT

A master cylinder for use in a vehicle braking system includes a main body defining a cylinder bore therein and a piston working in the cylinder bore. A sleeve is inserted into the cylinder bore and engages the main body with a projection-and-recess arrangement therebetween thereby restricting the retracting movement of the piston.

9 Claims, 6 Drawing Figures

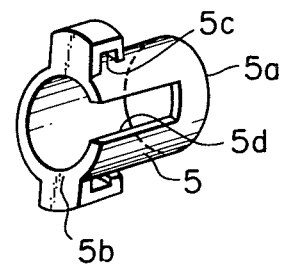
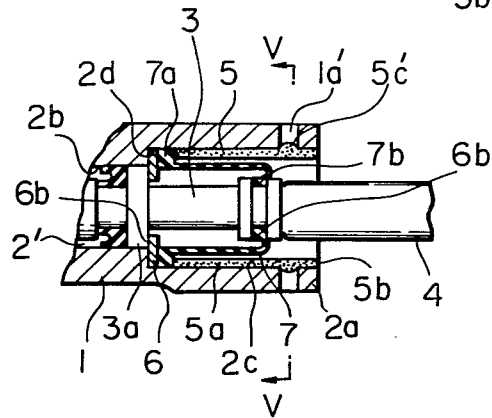
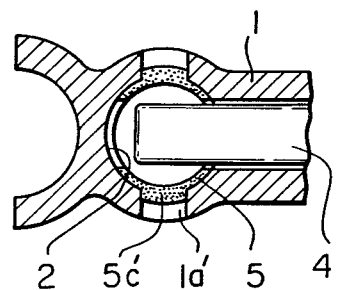
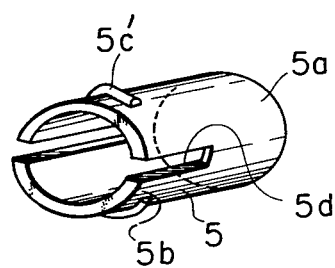

MASTER CYLINDER

This is a continuation of application Ser. No. 743,215, filed Nov. 18, 1976, now abandoned.

BACKGROUND OF THE INVENTION

This invention relates to a master cylinder for use in a hydraulic braking system of a vehicle.

Usually an annular groove is formed adjacent the open end of a cylinder bore which has a piston slidably positioned therein, and a generally C-shaped snap ring is fitted in the annular groove for restricting rearward movement of the piston and retaining the piston in the cylinder bore.

Since the annular groove is disposed in the inner wall of the cylinder bore, the groove cannot integrally be formed when forming the master cylinder itself, thus requiring an additional machining process. Further, when the open end portion of the cylinder bore of the master cylinder is formed to extend rearwardly so as to cover and protect a dust cover, as in the case of a master cylinder of a two-wheeled vehicle or the like wherein the master cylinder itself is directly exposed to the exterior, the location of the annular groove is remote from the open end of the cylinder bore, thereby preventing easy assembling and disassembling of the C-shaped ring.

SUMMARY OF THE INVENTION

An object of the present invention is to solve the aforementioned shortcomings of the prior art master cylinders by providing a master cylinder having a sleeve fitted in the open end portion of a cylinder bore, which sleeve acts to prevent the piston from escaping from the cylinder and also to retain a dust cover in its position.

BRIEF DESCRIPTION OF THE DRAWINGS

The present invention will be explained in detail in conjunction with the accompanying drawings which illustrate two embodiments of the present invention, and in which:

FIG. 3 is a perspective view of the sleeve shown in FIG. 2;

FIG. 4 is a cross-sectional view showing a modified-form of the present invention;

FIG. 5 is a cross-sectional view taken along line V—V in FIG. 4; and

FIG. 6 is a perspective view of the sleeve shown in FIGS. 4 and 5.

DETAILED DESCRIPTION OF THE INVENTION

Figure 1:
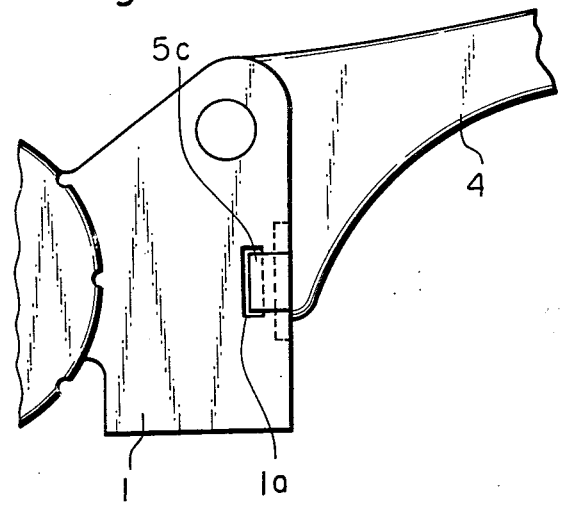
FIG. 1 is a partial plan view of a master cylinder according to the present invention.
Figure 2:
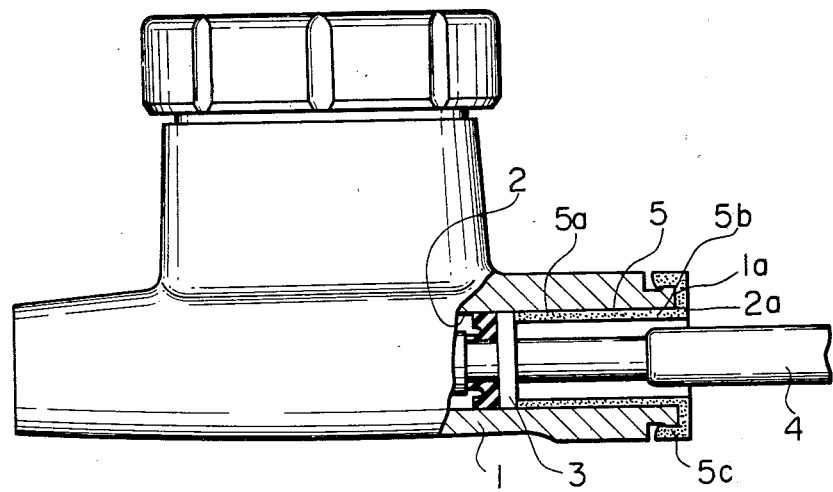
FIG. 2 is a partial cross-sectional side view of the master cylinder of FIG. 1.

Referring to FIGS. 1, 2 and 3, a main body 1 of a master cylinder has a cylinder bore 2 slidably receiving therein a piston 3. The piston 3 is actuated by a brake lever 4 to compress brake liquid in a pressure chamber defined in front of (the left side in FIG. 2) the piston 3 for supplying liquid under pressure to the brake wheel cylinders (not shown). A sleeve 5 formed of a synthetic resin material or a metal is fitted into the cylinder bore 2 through an open end 2a of the bore 2 such that the inner end 5a of the sleeve 5 abuts with the piston 3 when the piston 3 is in its retracted position. The outer end 5b of the sleeve 5 has two radially opposing projecting portions 5c each of which has a generally L-shaped cross-section as shown in FIG. 2 to define an engaging portion on the inner end thereof for snappingly engaging with a complementary recess 1a formed in each of the upper and lower sides of the main body 1. In the illustrated embodiment, the projecting portions 5c are formed on the upper and lower sides of the sleeve 5 as shown in FIG. 3 and recesses 1a are formed in generally flat upper and lower surfaces of the main body 1, but the recesses 1a may be formed as an annular groove in the outer circumference of cylindrically shaped outer end 2a of the main body 1 and the projecting portion 5c may be modified to be formed as an annular flange having an axially extending engaging portion. As shown in FIGS. 3 and 6, the sleeve 5 has a cylindrical wall, and an axially extending cut-out portion or slot 5d is formed in the sleeve 5, and extends entirely through at least one side or portion thereof, to receive the brake lever 4 therein. The projecting portions 5c act to prevent the rotation of the sleeve 5 around the axis thereof, whereby the brake lever 4 can freely move in the cut-out portion 5d.

FIGS. 4, 5 and 6 illustrate another embodiment of the present invention, in which a cylinder bore 2' consists of a reduced diameter portion 2b slidably receiving therein a piston 3 and a large diameter portion 2c receiving a sleeve 5. In the outer end portion 2a of the bore 2' two radially opposing recesses 1a' are formed to engage with radially projecting portions 5c' formed on the outer circumference of an end portion 5b of the sleeve 5 as shown in FIGS. 5 and 6. When the sleeve 5 is fitted in the large diameter portion 2c of the cylinder bore 2, the projecting portions 5c' will snappingly engage with the recesses 1a' and retain the sleeve 5 in the bore portion 2c. An annular ring 6 abuts with a shoulder 2d formed between the bore portions 2b and 2c to restrict the retracting movement of the piston 3. One end 7a of a dust cover 7 is clamped between the ring 6 and the inner end 5a of the sleeve 5, and the other end 7b of the dust cover 7 is fitted around the piston 3 as shown in FIG. 4 thereby preventing ingress of water, dust or the like into the bore portion 2b of the cylinder. Thus the sleeve 5 acts as a retaining device for the dust cover.

In the illustrated embodiments, projecting portions are formed on the sleeve to engage with recesses formed in the main body of the master cylinder, but the projecting portions may be formed on the main body of the master cylinder to engage with recesses formed in the sleeve.

It will be appreciated from the foregoing description that the sleeve according to the present invention for controlling the retracted position of the piston and preventing the piston from escaping out of the cylinder can easily be snappingly assembled and disassembled by applying an axial force thereon, thus avoiding usage of a special tool which is usually used for a C-shaped clamp ring. Further, the recess or projection formed on the main body of the master cylinder can be formed integrally in the forming process of the main body. Further, since the sleeve can also act as a retainer for the dust cover, the assembling operation is easy.

What is claimed is:

1. A master cylinder for use in a vehicle braking system, said master cylinder comprising:
   a main body formed of a single integral rigid member and having therein a bore with an open end;

a piston slidably positioned within said bore, said piston being permanently maintained in sliding contact with the inner surface of said bore;

an elongated hollow cylindrical sleeve extending into said bore through said open end thereof, said sleeve having an outer peripheral surface contacting the inner surface of said bore, said sleeve having a first axial end adjacent said piston and a second axial end adjacent said open end of said main body;

one of said main body and said sleeve having formed therein at least one recess extending radially with respect to the axis of said bore, the other of said main body and said sleeve having at least one integral projection projecting radially with respect to said axis of said bore, said at least one projection snappingly fitting into said at least one recess, thereby retaining said sleeve in said bore;

means, positioned adjacent said first end of said sleeve within said bore, for abutting against said piston to maintain said piston within said bore; and said sleeve having a cylindrical wall having therein at least one slot extending from said second end axially toward said first end of said sleeve, said slot extending entirely through at least one portion of said cylindrical wall of said sleeve, said axially extending slot being adapted for the receipt of a brake actuating lever.

2. A master cylinder as claimed in claim 1, wherein said main body has therein at least two recesses, and said sleeve has extending therefrom at least two projections, said projections snappingly fitting into said recesses.

3. A master cylinder as claimed in claim 2, wherein said recesses extend radially entirely through said main body.

4. A master cylinder as claimed in claim 1, wherein said sleeve is formed of a resilient material.

5. A master cylinder as claimed in claim 1, wherein said bore comprises an inner smaller diameter portion and an outer larger diameter portion, with a step between said smaller and larger portions, said piston is positioned in said smaller diameter portion, said sleeve is positioned in said larger diameter portion, and said abutting means comprises an annular ring positioned within said bore between said step and said inner end face of said sleeve, said ring having an outer annular surface contacting the surface of said larger diameter portion.

6. A master cylinder as claimed in claim 5, further comprising a dust cover having an inner end and an outer end, said dust cover being substantially entirely positioned within said sleeve, said inner end of said dust cover being positioned between said ring and said inner end face of said sleeve.

7. A master cylinder as claimed in claim 1, wherein said means for abutting against said piston operates to restrict the retracting movement of said piston toward said open end of said bore.

8. A master cylinder as claimed in claim 1, wherein said main body has therein an axially extending slot aligned with said axially extending slot in said sleeve.

9. A master cylinder as claimed in claim 8, further comprising a brake actuating lever having a first portion pivoted to said main body at a position thereof exterior of said bore and a second portion extending through said aligned axially extending slots in said main body and said sleeve for actuating said piston.

* * * * *